3,702,304
Patented Nov. 7, 1972

3,702,304
PAINT REMOVER COMPOSITIONS
Raymond G. Esposito, R.F.D. 2, Union, Maine 04862
No Drawing. Continuation-in-part of abandoned application Ser. No. 670,427, Sept. 25, 1967. This application June 16, 1971, Ser. No. 153,867
Int. Cl. C09d 9/04; C11d 7/50; C23g 5/02
U.S. Cl. 251—171                                     10 Claims

ABSTRACT OF THE DISCLOSURE

Removal of paint from exterior surfaces such as the outside of a house is facilitated by the use of an inexpensive, slow drying paint remover composition comprising essentially an oil-in-water emulsion of xylol with either dimethyl formamide, dimethyl acetamide, dichloromethane, or mixtures thereof.

RELATED CASE

This is a continuation-in-part of my co-pending application, Ser. No. 670,427, filed Sept. 25, 1967 now abandoned.

BACKGROUND OF THE INVENTION

Paint and varnish removers generally available for household use are either expensive and non-flammable or inexpensive and flammable. In addition, such paint removers commonly contain toxic ingredients.

One object of this invention is provide a paint and varnish remover which is inexpensive, non-flammable, and relatively non-toxic.

A further object of this invention is to provide such a paint remover which will remain continuously active and moist for an extended period of time, thus allowing the removal of multiple layers of paint, such as exterior paint.

SUMMARY OF THE INVENTION

This invention comprises generally a stable oil-in-water emulsion having significant and long-lasting paint removal activity and consisting essentially of water, xylol, and a liquid which is either dimethyl formamide, dimethyl acetamide, dichloromethane or mixtures thereof. The aqueous phase may be varied in volume percentage from about 10% to about 85% and that of the non-aqueous phase from about 15% to about 90% of the total emulsion. If the volume percentage of the aqueous phase is below about 10% the product is too thick to handle. If the volume percentage of the non-aqueous phase is below about 15% the paint removal activity is too low. Where dimethyl formamide, dimethyl acetamide or mixtures of dimethyl formamide and dimethyl acetamide are utilized the volume percentages are preferably about 30% to about 60% that of the aqueous phase. Where such volume percentages are exceeded the emulsion tends to be unstable.

The products of this invention are generally cream-like, of varying consistencies. The aqueous phase contains most of the dimethyl formamide and dimethyl acetamide where such are used. Where dichloromethane is used substantially all is in the non-aqueous phase, as is the xylol.

The rate of paint removal activity can be increased by modifying the product so as to include certain alcohols in the amount of about 2% to 20% by volume of the total emulsion. These alcohols include those that are water soluble, as, for example, methyl alcohol, ethyl alcohol, iso-propyl alcohol and n-propyl alcohol. The use of such modifying alcohols does however decrease the time over which the product will be active on the surface to which it is applied.

In order to form and maintain a stable emulsion, it is helpful to utilize an anionic detergent. Examples of such anionic detergents which are useful in the present invention include sodium oleate, sodium N-methyl-N palmitoyl taurate and dioctyl sodium sulfosuccinate. Generally, the amount of such anionic detergent should not exceed about 0.1% of the emulsion.

In addition, a water-soluble thickening agent, as for example sodium carboxymethyl cellulose, may be used in amounts up to approximately 2%. Also, an evaporation retardant, as for example polyethylene glycol or paraffin may be used in amounts up to about 2%.

The inexpensive, slow-drying emulsions of this invention permit efficient and economic paint removal particularly where a great deal of hand labor is involved, as, for example, removal of paint from the exterior of a house or boat. They avoid such disadvantages of prior art formulations (typically organic solvents) as high evaporation rates and high cost. The products of this invention can soften paint in a few minutes and be active for several days.

SPECIFIC EXAMPLES OF INVENTION

Example 1

An emulsion was prepared by mixing the following composition:

Water _____ml__ 200
Dimethyl formamide _____ml__ 200
Sodium carboxymethyl cellulose _____gm__ 4
Dioctyl sodium sulfosuccinate _____gm__ 1
Paraffin _____gm__ 2
Xylol _____ml__ 300

The resultant stable emulsion, which had a creamy consistency, was applied to various painted objects. Paint softening activity was tested by scraping with a spatula. Activity was noted within fifteen minutes and the preparation was still active and moist after remaining on the painted surface for forty-eight hours.

Example 2

An emulsion was prepared by mixing the following composition:

Water _____ml__ 150
Dichloromethane _____ml__ 150
Dimethyl formamide _____ml__ 150
Sodium carboxymethyl cellulose _____gm__ 2.5
Sodium oleate _____gm__ 1.0
Xylol _____ml__ 150

The resultant stable emulsion, which had a creamy consistency, was applied to painted objects. Paint softening activity was observed within five minutes and the film remained active for twenty-four hours.

Example 3

An emulsion was prepared by mixing the following composition:

Water _____ml__ 20
Dimethyl formamide _____ml__ 20
Sodium carboxymethyl cellulose _____gm__ 0.2
Dioctyl sodium sulfosuccinate (75% soln.) ____ml__ 0.3
Xylol _____ml__ 360
Paraffin _____gm__ 2

The resultant product was a very thick viscous but stable emulsion, having lower paint removal activity than Example 1.

Example 4

| | | |
|---|---|---|
| Water | ml | 100 |
| Dimethyl formamide | ml | 100 |
| Sodium carboxymethyl cellulose | gm | 2 |
| Dioctyl sodium sulfosuccinate | gm | 0.75 |
| Polyethylene glycol (MW 3700–4000) | gm | 2 |
| Xylol | ml | 350 |

A stable emulsion with a creamy consistency was formed.

The products of Example 4 exhibited paint softening activity within 15 minutes and the preparations were still active and moist after remaining on the painted surface for 24 hours.

I claim:

1. A stable, oil-in-water emulsion consisting essentially of water, xylol and a liquid which is selected from the group consisting of dimethyl formamide, dimethyl acetamide, dichloromethane or mixtures thereof; the volume percentage of the aqueous phase being in the range of about 10% to about 85% and that of the non-aqueous phase being in the range of about 15% to 90% of the total emulsion.

2. The composition of claim 1, wherein the liquid is dimethyl formamide.

3. The composition of claim 1 wherein the liquid is dimethyl acetamide.

4. The composition of claim 1 wherein the liquid is dichloromethane.

5. The composition of claim 1 wherein the liquid is a mixture of dimethyl formamide and dichloromethane.

6. The composition of claim 1 which is stabilized with an anionic detergent.

7. The composition of claim 1 which is stabilized with dioctyl sodium sulfosuccinate.

8. The composition of claim 1 wherein up to approximately 2% of a water-soluble thickening agent is included.

9. The composition of claim 1 wherein up to approximately 2% of either polyethylene glycol or paraffin is included.

10. The composition of claim 1 modified so as to include a water-soluble lower alcohol in an amount of about 2% to 20% by volume of the total emulsion.

References Cited

UNITED STATES PATENTS

| | | | |
|---|---|---|---|
| 2,495,728 | 1/1950 | Hutson et al. | 252—DIG. 8 |
| 3,179,609 | 4/1965 | Morison | 252—DIG. 8 |

FOREIGN PATENTS

| | | | |
|---|---|---|---|
| 818,331 | 8/1959 | Great Britain | 134—38 |

OTHER REFERENCES

Rose, The Cond. Chem. Dict. (1961), 6th ed., Reinhold Publ. Co., pp. 392-I, 1037-II.

LEON D. ROSDOL, Primary Examiner

W. E. SCHULZ, Assistant Examiner

U.S. Cl. X.R.

134—38; 252—DIG. 8